June 3, 1969     W. P. MOORE ETAL     3,447,901
PRODUCTION OF HYDROGEN CHLORIDE AND MAGNESIUM OXIDE
Filed Aug. 15, 1967
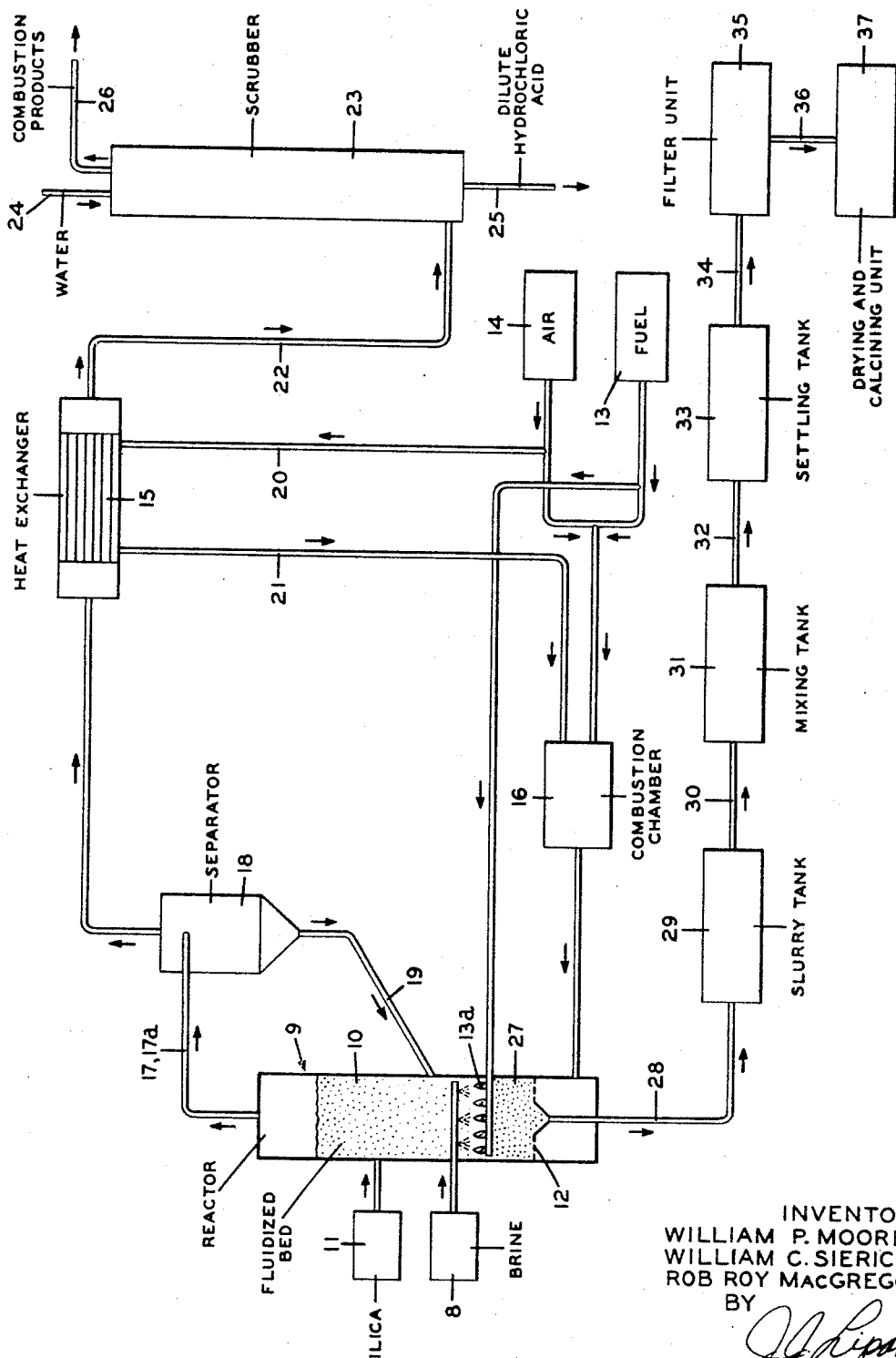
INVENTORS:
WILLIAM P. MOORE
WILLIAM C. SIERICHS
ROB ROY MacGREGOR
BY
ATTORNEY United States Patent Office 3,447,901
Patented June 3, 1969

3,447,901
PRODUCTION OF HYDROGEN CHLORIDE
AND MAGNESIUM OXIDE
William P. Moore, Chester, and William C. Sierichs and
Rob Roy MacGregor, Hopewell, Va., assignors to
Allied Chemical Corporation, New York, N.Y., a corporation of New York
Filed Aug. 15, 1967, Ser. No. 660,681
Int. Cl. C01b 7/08; C01f 5/02; C05d 5/00
U.S. Cl. 23—155                                    10 Claims

ABSTRACT OF THE DISCLOSURE

The production of hydrogen chloride and magnesium oxide particles by feeding a brine containing magnesium chloride and calcium chloride into a fluidized bed composed largely of magnesium oxide, silica and calcium silicate. Silica sand particles are added simultaneously with the brine into the fluidized bed. The solid particles of the bed are withdrawn from the bottom of the bed and may be used as fertilizer or treated with water and calcined to produce a relatively pure magnesium oxide.

BACKGROUND OF THE INVENTION

This invention relates to a method of producing hydrogen chloride and fertilizer-grade magnesium oxide from magnesium chloride utilizing a fluidized bed wherein the magnesium chloride is hydrolyzed to form the magnesium oxide and hydrogen chloride. It relates particularly to the continuous production of magnesium oxide particles of relatively low calcium oxide and calcium chloride content from magnesium chloride-rich brines which are contaminated with calcium chloride. The hydrogen chloride gas may be dissolved in water to form hydrochloric acid.

It is well known that magnesium chloride can be thermally decomposed in the presence of water to form magnesium oxide and hydrochloric acid. Although the theoretical basis of the reaction is well known, adaptation of the reaction to an economical commercial process has not been entirely satisfactory. Magnesium chloride hydrate melts at about its decomposition temperature, particularly if contaminated, thus forming an agglomerate mass which is difficult to handle, resulting in poor reaction rates and inefficiencies.

It has been proposed in U.S. Patent 3,251,650 that the problem of agglomeration may be avoided by using a fluidized bed of heated refractory particles wherein magnesium chloride hydrate contacts the particles and is converted to a porous magnesium oxide ash which is carried away from the reaction zone by exit gases. It has been found, however, that in such a process if the magnesium chloride is contaminated with significant proportions of calcium chloride, agglomeration of the fluid bed is a troublesome problem and a magnesium oxide product results which contains significant amounts of calcium oxide as an impurity, said impurity being difficult to separate from the desired magnesium oxide product, also a small amount of hydrogen chloride is given off. Since brines rich in magnesium chloride, but highly contaminated with calcium chloride, are available at relatively low cost, e.g., as intermediates or by-products in the recovery of mineral values from salt lakes, it is advantageous to produce high grade magnesium oxide and an appreciable amount of hydrogen chloride from such brines.

RELATED APPLICATION

The application relates to U.S. application, Ser. No. 625,279 filed Mar. 17, 1967 by William P. Moore, William C. Sierichs, Rob Roy MacGregor, which is directed to a continuous process for the efficient production of magnesium oxide substantially free of calcium oxide from magnesium chloride-rich brine solutions or slurries contaminated with calcium chloride. In general, the process includes the treating of an aqueous solution or slurry of magnesium chloride-rich brines contaminated with calcium chloride in a reactor containing a fluidized bed of particles consisting essentially of magnesium oxide. The particles are maintained in a fluidized state by upward passage of gases at elevated temperatures. In processing, the brine solids coat the particles of the fluidized bed, the magnesium chloride in the brine solids coating substantially converting to magnesium oxide and hydrogen chloride, while the calcium chloride of the brine remains essentially unconverted. The particles increase in size due to the build-up of coating until they drop out of the fluidized bed whereupon they are recovered. The resultant particulate product is rich in magnesium oxide with a relatively low content of calcium oxide.

With respect to the process of Ser. No. 625,279, there is, at times, some tendency for the particles in the fluidized bed to agglomerate due to gradual build-up of calcium chloride in the bed. Accordingly, conditions in the bed must be carefully controlled to avoid excessive calcium chloride build-up resulting in agglomeration which would cause the bed to lose fluidity. In particular, the calcium chloride in the feed to the reactor must be correlated with the reaction temperature and recycle of purified magnesium oxide or loss of fluidity in the fluid bed will ensue. Furthermore, the issuance of hydrogen chloride will decrease substantially.

Accordingly, it is an object of this invention to provide an improved fluid bed process for the production of hydrogen chloride and magnesium oxide from magnesium chloride sources containing calcium chloride, in which process the particles in the fluid bed have little or no tendency to agglomerate.

It is a further object of this invention to provide a continuous process for the efficient production of hydrogen chloride and magnesium oxide, which is substantially free of calcium oxide, from magnesium chloride-rich brine solutions or slurries contaminated with calcium chloride.

It is an additional object of this invention to provide a process for the concurrent production of dilute hydrogen chloride and magnesium oxide of relatively high purity.

SUMMARY OF THE INVENTION

In accordance with the present invention, magnesium oxide is produced continuously by feeding a brine containing 10–60% magnesium chloride based on the weight of the brine and 10–30% of calcium chloride based on the weight of magnesium chloride into a fluidized bed of particles containing at least 35% magnesium oxide. The particles contain a maximum calcium chloride content of 15%, preferably less than 8%, based on the weight of the particles. Silica sand particles are also added into the fluidized bed in amounts such that the molar ratio of silica to the calcium chloride in the brine being added is about 0.85:1 to 3.0:1. The fluidized bed is maintained at 600–1100° C. The product particles from the fluidized bed are then separated and may be used as fertilizer-grade magnesium oxide or purified to obtain a magnesium oxide product containing 84–99% magnesium oxide which is substantially free of calcium oxide. The hydrogen chloride given during the reaction is recovered in water to give a substantial amount of dilute hydrochloride acid.

BRIEF DECRIPTION OF THE DRAWING

The drawing is a schematic illustration of the invention according to a preferred embodiment of the process. Purification steps may be omitted if a fertilizer-grade magnesium oxide product is desired.

DESCRIPTION OF THE PREFERRED EMBODIMENT

A suitable brine utilized in this process is of the magnesium chloride-rich type contaminated with calcium chloride, the magnesium chloride content being from about 10 to 60 weight percent, preferably 25 to 35 weight percent, based on the weight of brine. The calcium chloride content of the brine constitutes from about 10 to 30 weight percent, preferably 15 to 25 weight percent, based on the weight of the magnesium chloride component of the brine. The brine is normally available in the form of either an aqueous solution or a slurry having a concentration of solids ranging from about 10–40% and preferably the mol ratio of $H_2O$ to magnesium in the brine is between 3 and 7. Where the brine is a slurry, at least part of the solids will exist in the form of hydrates, such as $MgCl_2 \cdot 6H_2O$. However, in describing the proportions of chemical constituents of the brine solids, water of hydration is excluded and the proportions of the constituents are described based on their anhydrous form. All the percents are by weight unless otherwise specified.

The brine is fed from a source 8, preferably of the spray type into a fluidized reactor 9 containing a bed 10 of mostly magnesium oxide, calcium silicate and silica particles. Preferably, the brine is fed into the reactor 9 at a location other than that above the fluidized bed in order to achieve a good contact with the bed particles therein. The rate of brine feed is controlled by suitable means, not shown, to avoid surpassing of the heating capacity of the bed, since excessive feeding will cause the bed to cool thereby resulting in a retardation of the decomposition of the $MgCl_2$ in the brine.

The bed 10 is comprised of particles having an overall magnesium oxide content of at least generally 35%, preferably 55–65%, and a calcium chloride content of no more than about 15% and preferably no more than 8% based on the weight of the particles. The size of the particles in the fluidized zone are usually from about 650–1000 median diameter microns and preferably from 650–850 median diameter microns.

Silica and particles in either dry or aqueous form, are introduced into the fluidized bed from a source 11 in amounts such that the molar ratio of silica to the calcium in the brine being added will be between about 0.85:1 and about 3.0:1 and desirably at about 1:1 to 2.0:1. This addition of a small amount of sand to the reaction mixture in the fluid bed allows smooth conversion of potentially sticky $CaCl_2$ to refractory $CaSiO_3$. Surprisingly, the $SiO_2$ does not attack $MgCl_2$, but allows its smooth hydrolysis to valuable MgO.

To prevent contamination of the magnesia product with unreacted sand, we have found that it is preferable to feed sand particles with median diameter of above 350 microns and below 800 microns. Further, it is important that the amount of sand used be minimized and it is preferable to use no more than a 1 mol excess over the stoichiometric amount required for reaction with the calcium ion present in the brine. As previously stated, mol ratio of silica to the calcium of 1:1 to 2.0:1 is desirably introduced into the bed.

The bed particles are heated by a mixture of fuel, air and combustion products passing from sources 13, 14 and 15, respectively, through a combustion chamber 16 and into the reactor. The gases employed in maintaining the fluidized zone should preferably be essentially unreactive with the constituents of the brine, the gases employed including air and mixtures of air and combustion products of propane, natural gases, oil or other fuels. The gas flowing from chamber 16 passes through openings of a conventional fluid bed grate 12 to maintain the bed particles in a state of fluidization. The bed particles also are heated by a burning of the fuel, generally referred to at 13a, within the bed itself. Significantly, the direct burning of fuel within the bed itself creates very high temperatures, approaching flame temperatures, directly on the surface of the magnesia particles thereby accelerating the decomposition reactions. The bed temperature is maintained from 600° to 1100° C., preferably 750° to 950° C. It is preferable to maintain the pressure in the reactor at near atmospheric, e.g., about 3 to 7 p.s.i.g., and the flow of gas through the reactor 9 is at a velocity of from about 5 to 8 feet per second.

We have found that no $MgSiO_3$ is formed if the reaction temperature is maintained sufficiently high, and the $H_2O$ to $MgCl_2$ ratio is sufficiently high to cause the $MgCl_2$ reaction to be nearly instantaneous. More specifically, $MgCl_2$ hydrolysis reaction is fast enough to prevent $MgSiO_3$ formation at temperatures above 600° C. with a $H_2O/MgCl_2$ mol ratio higher than 2:1. Reaction temperatures above 1100° C. cause appreciable hydrolysis of $CaCl_2$ to CaO before the $CaSiO_3$ forms and results in an unsatisfactory magnesia product.

The fluid bed particles are the products of reaction and are composed primarily of MgO, $CaSiO_3$ with some unreacted silica and small amounts of $CaCl_2$, NaCl and KCl. The fluid bed is essentially homogeneous and is maintained in a turbulent condition. The solids are continuously withdrawn from the bottom of the fluid bed through line 28, hereinafter described, and hot gases 17, containing valuable HCl, and fine solids 17a are withdrawn from the top of the fluid bed, now to be described.

Effluent hot gases 17 and elutriated fine solids 17a pass from the reactor 11 into a cyclone separator 18 wherein they are separated. The elutriated fine solids 17a, consisting mainly of magnesium oxide, are of 50 to 325 mesh size and may be either returned directly to the fluidized bed through passage 19 to serve as fresh nuclei in the reactor or recovered for use as a magnesium oxide product. Alternatively, the solids 17a may also be returned to the reactor in a manner such that they are slurried into the input brine. The effluent gases 17 pass from the cyclone separator into a heat exchanger 15 where they are cooled to about 350–400° C. by air passing through passage 20. The heated air and combustion products exit from the heat exchanger 15 through line 21 and are preferably recycled through the combustion chamber 16 into the reactor 11.

The gas leaving the heat exchanger 15 through exit line 22 contains HCl, $H_2O$, and combustion products. This HCl-containing gas may be used directly or it may be used to produce aqueous HCl as shown in the drawing. The gas passes through a scrubber 23 wherein it is contacted with water entering the scrubber through pipe 24, so as to absorb the HCl and form dilute hydrochloric acid, ranging from about 1 to 13 weight percent, which passes from the scrubber through line 25 into a suitable receptacle (not shown). The remaining combustion products substantially exit from the scrubber as overhead gases through line 26 and are discarded therefrom.

During the process, the heavier magnesia-calcium chloride particles 27, i.e. those larger than about 30 mesh median size, fall from the fluidized bed and are discharged from the lower portion of the reactor. These particles may be used directly as fertilizer-grade MgO, or they may be purified as shown by passing through line 28 into a tank 29 wherein they are mixed with water at about 80–100° C. to provide a slurry. The hydrated crude magnesium mixture passes through line 30 into tank 31 wherein it is blended again with water at ambient temperature. The slurry mixture containing preferably 5–20 weight percent solids is then pumped through line 32 into a settling tank 33 and retained therein for a desired time until the heavy $SiO_2$ and $CaSiO_3$ particles are settled. Alternatively a liquid cyclone separator (not shown) can be utilized to separate the solids in lieu of the settling tank 33. The magnesium oxide is largely slaked to $Mg(OH)_2$, essentially all the magnesia being suspended as a light and very fine slurry. The magnesium hydroxide slurry is passed through line 34 into a filtering unit 35 wherein the magnesium hydroxide is filtered and the solids washed with an equal weight of water to remove the chloride therein. The filtered Mg(OH)₂ is then passed through line 36 into a unit 37 for drying and calcining to produce magnesia product having a relatively high magnesium oxide content.

The following examples illustrate one method of carrying out the present invention and is not intended to limit the invention in any respect.

Example I

The fluid bed reactor used in this example was constructed of a 36-inch diameter carbon steel pipe 20 feet tall, lined with one course of insulating brick and an inner course of magnesia refractory brick. The inside diameter of the reactor was 18 inches. The reactor was provided with a fluidizing riser or plate containing 21 air distributors. This plate was located 3 feet up from the bottom of the reactor and contained a solids discharge line for removal of crude magnesia.

Aqueous brine solution containing 28.8% MgCl₂, 5.7% CaCl₂, 1.0% NaCl and 0.6% KCl, by weight, was introduced at a rate of 110 pounds per hour for 36 hours into a fluid bed reactor lined with fire brick having a cross-sectional area of 1.77 square feet and a static bed depth of 4.6 feet.

The bed initially consisted of 920 pounds of magnesia particles from a previous run. Distribution of particle size at the start of the run, using U.S. standard screens, was approximately 10 to 40 mesh material. During the runs, silica sand (about 28 mesh) was added to the bed at about 5 pounds per hour.

The magnesia particles at the start of the run had about the following composition:

| Component: | Weight percent |
|---|---|
| MgO | 56 |
| CaSiO₃ | 22 |
| NaCl | 4 |
| KCl | 3 |
| CaCl₂ | 5 |
| SiO₂ | 10 |

The fluidized bed was maintained at an average temperature of about 850° C. by burning natural gas at 12.3 cubic feet per minute (standard conditions).

The hot gases exited from the reactor as overhead and were conducted through a cyclone separator to remove fine solids, the gases were then passed through a water-scrubber and discharged.

After all flows to the system had been stabilized and the system had been operated for 24 hours, operating data for the system were taken throughout a 12-hour test period as described below.

During the test period there was fed 110 pounds per hour of a magnesium chloride brine with the following analysis:

| Component: | Weight percent |
|---|---|
| MgCl₂ | 28.8 |
| CaCl₂ | 5.7 |
| NaCl | 1.0 |
| KCl | 0.7 |
| H₂O | 63.8 |
| | 100.0 |

The sand feed rate was 5.09 pounds per hour. The sand particle median diameter was 660 microns. The bed temperature was maintained at 850° C. by burning 12.3 s.c.f. per minute of natural gas in the bed. Air feed through the reactor grate was 160 s.c.f. per minute. The combustion gases were removed from the reactor top through a cyclone and had the following analysis:

| Component: | Weight percent |
|---|---|
| HCl | 3.06 |
| CO₂ | 10.14 |
| O₂ | 4.40 |
| N₂ | 67.01 |
| H₂O | 15.39 |
| | 100.00 |

Bed solids were removed at a rate of 24.17 pounds per hour in order to maintain a constant solids level in the reactor. The analyses of these solids were:

| Component: | Weight percent |
|---|---|
| MgO | 55.53 |
| CaCl₂ | 5.19 |
| CaSiO₃ | 21.71 |
| NaCl | 4.55 |
| KCl | 3.19 |
| SiO₂ | 9.83 |
| | 100.00 |

The solid particle median diameter was 750 microns. No MgSiO₃ was found in the bed.

These solids from the bed are suitable for use as fertilizer-grade magnesium oxide. Alternatively, the solids may be purified as described in Example II to produce a relatively pure magnesium oxide suitable for use as a fertilizer or for other uses such as in preparation of refractory materials.

Example II

The crude solids from the fluid bed reactor of Example I were slurried in 35.76 pounds per hour of water at 90° C. and the mixture was agitated in a pugmill for about 1.5 hours. The resulting hydrated crude magnesia was then discharged to a mixing vessel and blended with 210.65 pounds per hour of additional water at ambient temperature. The slurry was then pumped to a settling tank which provided about 15 minutes retention time for settling of the heavy SiO₂ and CaSiO₃ particles. The feed rate of slurry to this settler was 270.6 pounds per hour.

The overflow magnesium hydroxide slurry from the settler was 211.12 pounds per hour with the following composition:

| Component: | Weight percent |
|---|---|
| Mg(OH)₂ | 5.52 |
| CaSiO₂ | 0.17 |
| SiO₂ | 0.08 |
| CaCl | 0.48 |
| NaCl | 0.43 |
| KCl | 0.30 |
| H₂O | 93.02 |
| | 100.00 |

This represents about a 60% recovery of magnesium hydroxide. This Mg(OH)₂ stream was filtered and the solids were washed with water to remove the chlorides. Analysis of the dried and calcined magnesia was:

| Component: | Weight percent |
|---|---|
| MgO | 93.0 |
| CaSiO₃ | 4.3 |
| SiO₂ | 2.0 |
| Others | 0.7 |
| | 100.0 |

Higher magnesia recoveries and purity can be obtained by using more settling stages, more efficient settling equipment and by the use of more water in the slurry feed to classification. The crude magesia feed containing higher percentages of MgO produces purer MgO product under comparable operating conditions. For example, heavy impurities settled from crude magnesia containing about 30 weight percent MgO gave a product containing 84 weight percent MgO; whereas, a crude product containing about 78 weight percent MgO gave a final magnesia containing over 99.3 weight percent MgO.

The illustrations of the method that constitutes the invention given above are not intended to limit the invention in any way but are merely descriptive of the method. All modifications which fall within the spirit of the present invention are claimed as part of the present invention.

We claim:
1. A process for the continuous production of hydrogen chloride and magnesium oxide comprising:
   (a) feeding a brine having 10–60% magnesium chloride based on the weight of the brine and 10–30% of calcium chloride based on the weight of the magnesium chloride into a fluidized bed of particles maintained at 600–1100° C. having at least 35% magnesium oxide and a maximum content of 15% calcium-chloride based on the weight of the particles;
   (b) adding silica sand particles into the fluidized zone such that the molar ratio of silica to the calcium chloride in the brine is about 0.85:1 to 3.0:1; and
   (c) separating HCl containing gas overhead and the product particles from the fluidized bed.
2. The process of claim 1 wherein the size of the particles in the fluidized zone have a median diameter of 650–1000 microns.
3. The process of claim 1 wherein the fluidized zone is maintained at temperatures of from about 750–950° C.
4. The process of claim 1 wherein the HCl gas formed in the process is recovered as a dilute aqueous solution of HCl.
5. The process of claim 1 wherein the brine has a conentration of 25–35% of magnesium chloride based on the weight of the brine and 15–25% of calcium chloride based on the weight of magnesium chloride.
6. The process of claim 1 wherein the fluid bed particles are composed primarily of MgO, $CaSiO_3$, $SiO_2$, $CaCl_2$, NaCl and KCl, the solids being continuously withdrawn from the bottom of the fluid bed and the hot gases containing HCl being withdrawn from the top of the fluid bed.
7. The process of claim 1 wherein the $H_2O/MgCl_2$ mol ratio in the brine is between 2:1 to 10:1.
8. The process of claim 1 wherein the sand particles fed into the fluidized reactor have a median diameter between 350–800 microns.
9. The process of claim 1 wherein the product solids from the fluidized bed are slurried with water at about 80–100° C. to form $Mg(OH)_2$, separating the $SiO_2$ and $CaSiO_3$ from the $Mg(OH)_2$ slurry, filtering the $Mg(OH)_2$ slurry, and calcining and drying the filtered $Mg(OH)_2$.
10. A process for the production of hydrogen chloride and magnesium oxide continuously comprising:
   (a) feeding a brine containing 25–35% of magnesium chloride based on the weight of the brine and 15–25% of calcium chloride based on the weight of magnesium chloride into a fluidized bed of particles having at least 55% magnesium oxide and a maximum content of 8% calcium chloride based on the weight of the particles, said magnesium chloride having a $MgCl_2:H_2O$ mol ratio ranging from 1:3–1:7;
   (b) maintaining the fluidized bed at a temperature of about 750–950° C., the fluidized bed having particles therein ranging in size between 650–850 microns;
   (c) adding silica sand particles having a median diameter between 350–800 microns into the fluidized zone, the amount of $SiO_2$ added to the calcium in the brine having a mol ratio ranging between 1:1 to 2:1;
   (d) separating HCl gas from the effluent gas and mixing same with water to produce dilute aqueous HCl;
   (e) separating the product solids, which include MgO, $CaSiO_3$, $SiO_2$, $CaCl_2$, NaCl and KCl, from the fluidized bed;
   (f) slurrying said product solids with water at 80–100° C. wherein the magnesium oxide is converted to $Mg(OH)_2$;
   (g) settling out all the $SiO_2$ and $CaSiO_3$;
   (h) filtering out the remaining solids; and
   (i) calcining and drying the remaining $Mg(OH)_2$ to produce a magnesium oxide having 84–99% MgO content.

References Cited
UNITED STATES PATENTS

| | | | |
|---|---|---|---|
| 2,191,561 | 2/1940 | Farnsworth et al. | 23—201 XR |
| 2,954,277 | 9/1960 | Thomsen | 23—201 |
| 3,251,650 | 5/1966 | Bengtson | 23—201 |

EDWARD STERN, *Primary Examiner.*

U.S. Cl. X.R.

23—201; 71—63; 106—58